United States Patent
Tamura et al.

(10) Patent No.: US 7,280,665 B2
(45) Date of Patent: Oct. 9, 2007

(54) IMAGE DISPLAY DEVICE WITH BUILT-IN LOUDSPEAKERS

(75) Inventors: Ichiro Tamura, Utsunomiya (JP); Kohji Ohtsuka, Kawachi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 227 days.

(21) Appl. No.: 10/506,782

(22) PCT Filed: Mar. 4, 2003

(86) PCT No.: PCT/JP03/02527

§ 371 (c)(1),
(2), (4) Date: Sep. 7, 2004

(87) PCT Pub. No.: WO03/079718

PCT Pub. Date: Sep. 25, 2003

(65) Prior Publication Data

US 2005/0129263 A1    Jun. 16, 2005

(30) Foreign Application Priority Data

Mar. 15, 2002  (JP) .............................. 2002-071350

(51) Int. Cl.
*H04R 25/00* (2006.01)

(52) U.S. Cl. ................... 381/333; 381/306; 381/388

(58) Field of Classification Search ............... 381/333, 381/300–306, 388, 160, 308, 335, 345, 386, 381/182, 186, 349, 351, 390–391, 189; 181/144–145, 181/147, 199, 155–156; 361/681–683, 686; 348/836, 838
See application file for complete search history.

(56) References Cited

U.S. PATENT DOCUMENTS 3,989,909 A * 11/1976 Hodsdon et al. ............ 381/391

(Continued)

FOREIGN PATENT DOCUMENTS

EP        801514 A2 * 10/1997

(Continued)

OTHER PUBLICATIONS

Microfilm of the Specification and drawings annexed to the request of Japanese Utility Model Application No. 177573/1980 (Laid-open No. 100392/1982) (Tokyo Shibaura Electric Co., Ltd.).

(Continued)

*Primary Examiner*—Huyen Le
(74) *Attorney, Agent, or Firm*—Birch, Stewart, Kolasch & Birch, LLP (57) ABSTRACT

An image display device has a main display body provided with a thin display unit, a low-frequency loudspeaker (woofer) and two middle and high frequency loudspeakers (tweeters) and a stand supporting the main display body. The stand has a base being just opposite at its top surface to a duct outlet of the woofer, thereby sound emitted from the duct can be constantly absorbed by and reflected from the base. A housing containing the first loudspeaker and a pair of the second loudspeakers has a plurality of through holes formed in a first area corresponding to an aperture of each loudspeaker and a plurality of blind holes formed in a second area surrounding the first area, wherein the second area for the first loudspeaker is different in peripheral shape and/or size from the second area for each of the second pair of loudspeakers.

16 Claims, 11 Drawing Sheets

U.S. PATENT DOCUMENTS

| | | | |
|---|---|---|---|
| 4,919,227 A * | 4/1990 | Chicoine | 181/175 |
| 5,005,201 A * | 4/1991 | Rumreich et al. | 381/306 |
| 5,400,414 A * | 3/1995 | Thiele | 381/190 |
| 5,514,841 A | 5/1996 | Rochon | |
| 5,737,123 A | 4/1998 | Donohoe | |
| 5,825,903 A * | 10/1998 | Shiota et al. | 381/391 |
| 6,381,125 B1 * | 4/2002 | Mizoguchi et al. | 361/682 |
| 6,807,051 B2 * | 10/2004 | Takahashi | 361/681 |
| 6,912,290 B1 * | 6/2005 | Thorsell et al. | 381/338 |
| 2004/0234088 A1 * | 11/2004 | McCarty et al. | 381/306 |

FOREIGN PATENT DOCUMENTS

| | | |
|---|---|---|
| GB | 2239763 A | 7/1991 |
| JP | 59-201600 A | 11/1984 |
| JP | 3-147498 A | 6/1991 |
| JP | 7-274273 A | 10/1995 |
| JP | 8-168037 A | 6/1996 |
| JP | 09-284674 A | 10/1997 |
| JP | 11-168783 A | 6/1999 |
| JP | 11-259011 A | 9/1999 |
| JP | 2001-42779 A | 2/2001 |
| JP | 2001-145186 A | 5/2001 |
| JP | 2002-152871 A | 5/2001 |
| WO | WO-01/50745 A1 | 7/2001 |

OTHER PUBLICATIONS

CD-ROM of the Specification and drawings annexed to the request of Japanese Utility Model Application No. 5196/1992 (Laid-open No. 65196/1993) (Mitsubishi Electric Corp.).

Microfilm of the Specification and drawings annexed to the request of Japanese Utility Model Application No. 44103/1990 (Laid-open No. 4493/1992) (Kenwood Corp.).

* cited by examiner

IMAGE DISPLAY DEVICE WITH BUILT-IN LOUDSPEAKERS

FIELD OF THE INVENTION

The present invention relates generally to an image display device and, more specifically, to a personal computer equipped with a thin display such as a liquid crystal display (LCD) device and a plasma display panel (PDP) device or an image display device applicable to a display portion of a television receiver.

BACKGROUND OF THE INVENTION

In recent years, the production of small and thin electronic devices has been advanced with development of electronic technology and a growing consumers' demand for thinner and smaller home electronic apparatuses. Indeed, various kinds of television receivers are now available, which are constituted by using thin CRTs, LCD panels and plasma-display panels. The television receivers have video reproducing function and sound reproducing function. The latter function is realized generally by means of loudspeakers.

Figure 1:
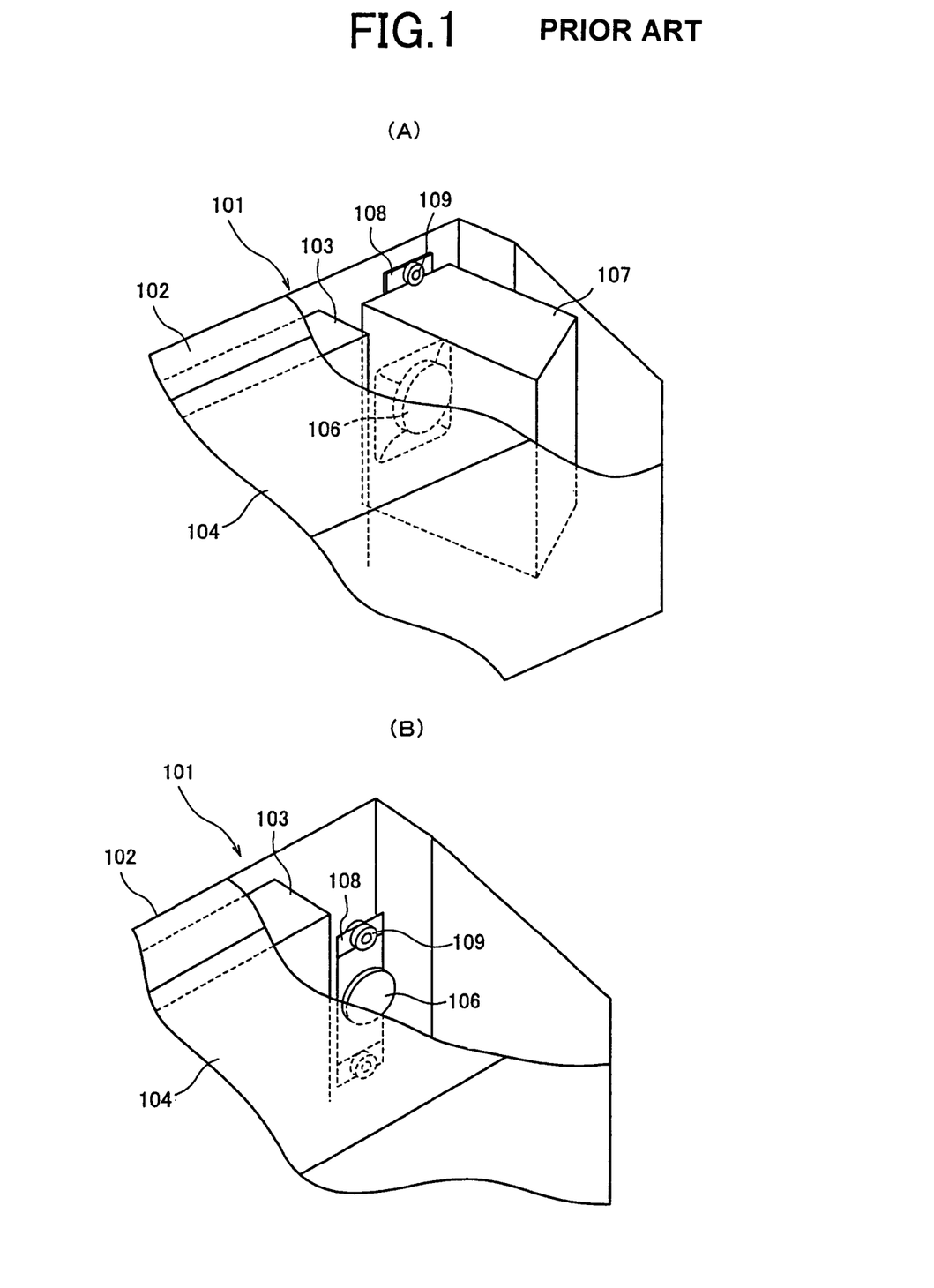
FIG. 1 is a perspective view showing an exemplary construction of an essential portion of a conventional television receiver.
Figure 2:
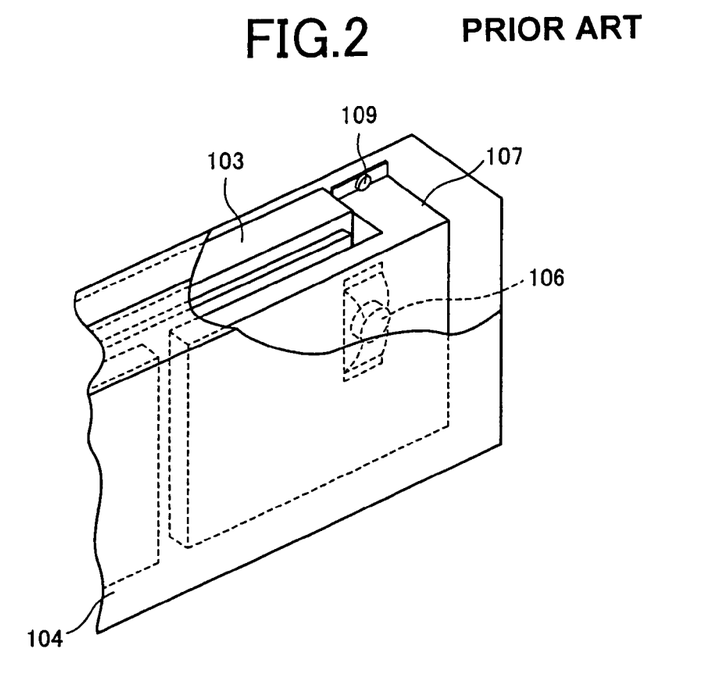
FIG. 2 is a perspective view showing an exemplary construction of an essential portion of a conventional television receiver.

FIGS. 1 and 2 illustrate a typical exemplary structure of a loudspeaker portion of a conventional television receiver (e.g., see the following Patent Document 1). FIG. 1(A) is a perspective view of an essential portion of a television receiver in which a loudspeaker box is mounted on an installing place. FIG. 1(B) is a perspective view of a portion of a television receiver cabinet to which a single loudspeaker unit is directly attached.

In FIG. 1(A), the television receiver 101 is composed mainly of a front cabinet 102, a display (e.g., CRT) 103, and a rear cover 104. A loudspeaker box 107 with a loudspeaker 106 mounted therein is fitted to the front cabinet 102 via a vibration-proof material 108 with a machine screw 109. Sound generated from the loudspeaker 106 is output through a vent hole (not shown) mounted on the front cabinet 102 and spread forward at the front face of the television receiver 101.

In FIG. 1(B), a loudspeaker 106 is fixed to a front cabinet 102 of a television receiver 101 via a vibration-proof material 108 with a machine screw 109. Similarly, as described in the case of FIG. 1(A), sound generated from the loudspeaker 106 is output through a vent hole (not shown) mounted on the front cabinet 102 and spread forward at the front face of the television receiver 101.

FIG. 2 is a perspective view of another example of a conventional television receiver. In the shown example, an L-shaped bent part of a loudspeaker box 107 is placed between a display 103 and a rear cover 104. Thus, the loudspeaker box can reproduce high quality sound while realizing a thin profile of the television receiver.

Figure 3:
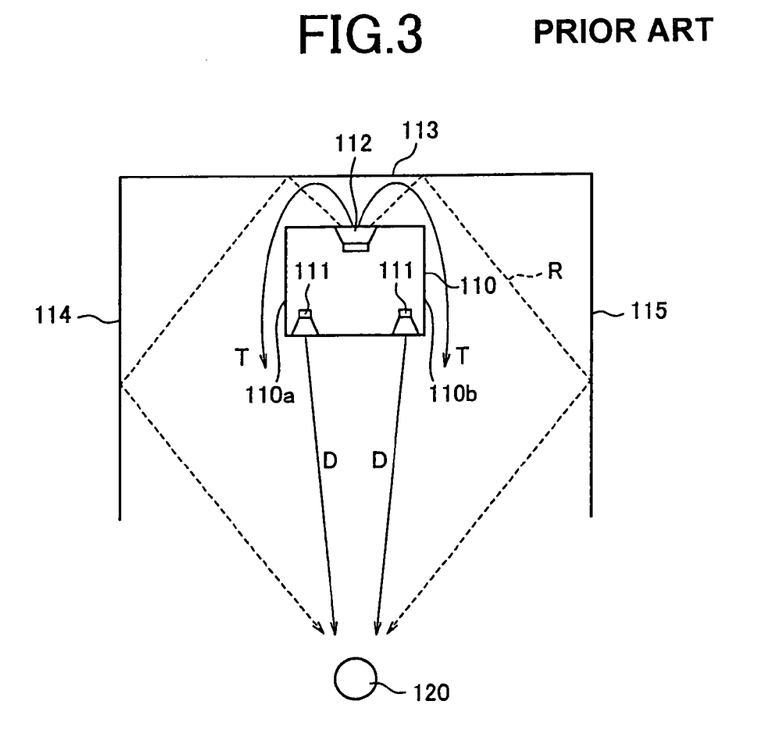
FIG. 3 is a schematic plan view showing another exemplary construction of a conventional television receiver.

FIG. 3 is a plan view of another example of a conventional television receiver wherein a pair of right and left loudspeakers 111 for reproducing sounds of relatively high frequency (in a range of middle and high sound frequencies) are provided at a front face of the television receiver 110 and a loudspeaker 112 for reproducing sounds of relatively low frequency is provided at a rear face of the television receiver 110, expanding a sound field (e.g., see the following Patent Document 2). In this case, as indicated in FIG. 3, the left and right sound signals of relatively high frequency from the left and right loudspeakers travel along corresponding paths D and directly reach a listener 120. Sound of low frequency from the low frequency loudspeaker 112 reflects from the rear wall 113 and the left and right walls 114, 115, travels along the corresponding paths R and reaches the listener 120. The remaining portion of sound from the same loudspeaker 112 diffracts, travels along the left and right side walls 110a, 110b of the television receiver 110 and reaches the listener 120. Thus, the sound field is expanded sufficiently without increasing the lateral width of the television receiver 110.

Figure 4:
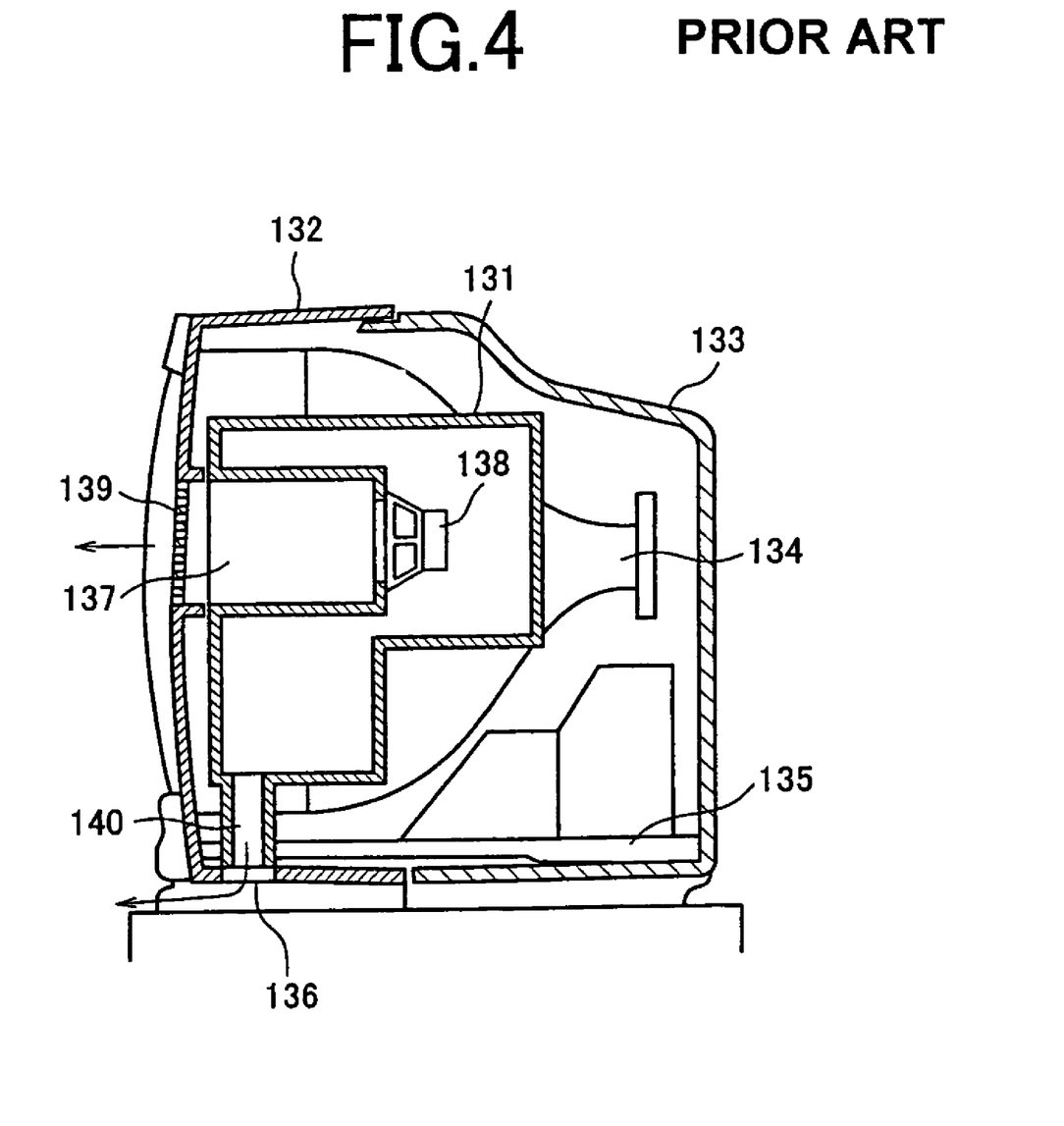
FIG. 4 is a schematic cross-sectional view showing another exemplary construction of a conventional television receiver.

FIG. 4 illustrates another exemplary construction of a conventional television receiver having a loudspeaker device composed of a loudspeaker 138 with a sound introducing pipe 137 arranged on the front face thereof and a woofer box 131 arranged on the rear face thereof. The woofer box 131 has a downwardly directed port 140. The television receiver has a cabinet 132 housing a CRT 134, a control circuit board 135 and a loudspeaker device and a back cover 133. The cabinet 132 has a sound emitting port 139 corresponding to the sound guiding pipe 137 in the front side and an opening 136 corresponding to the port 140 in the underside so as to enhance the effect of sound of low frequency (e.g., see the following Patent Document 3).

Any television receiver is required to use a large loudspeaker designed to reproduce sounds of relatively low frequency in conjunction with two loudspeakers designed to reproduce sounds of middle and high frequencies. On the other hand, recent television receivers have a very restricted space allocated for loudspeakers so as to achieve sophisticated design and appearance. For this reason, a small-sized loudspeaker is necessarily applied as a woofer. In other words, the appearance of the article has been improved at the sacrifice of the quality of reproducible sound of low frequency.

The conventional television receiver having a reduced lateral width as shown in FIG. 1(A) has the following drawbacks. It has no space for locating a loudspeaker box having a normal size and requires a reduced profile of the loudspeaker box at the sacrifice of the quality of reproducible sound. The conventional television receiver as shown in FIG. 1(B) has the following drawbacks. Because of the absence of a loudspeaker box, the television receiver has a small dynamic range of its sound system and therefore cannot deliver high quality sound reproduction. The conventional television receiver as shown in FIG. 4 is a CRT type receiver whose design cannot be applicable as a solution of improving the sound reproduction system of wall-mounted television receivers using LCD panels.

In view of the above-described circumstances, the present invention was made to provide an image display device which has a high-fidelity sound-reproduction system composed of a loudspeaker (woofer) for reproducing sounds of low frequency and two loudspeakers (tweeters) for reproducing middle and high frequencies, which is featured by the effect of expanded sound field with improved external/internal design and is applicable in particular to personal computers or television receivers equipped with a thin display unit such as a LCD and PD panel.

Patent Document 1: Japanese Laid-Open Patent Publication No. 09-284674

Patent Document 2: Japanese Laid-Open Patent Publication No. 59-201600

Patent Document 3: Japanese Laid-Open Patent Publication No. 2001-145186

SUMMARY OF THE INVENTION

An object of the present invention is to provide an image display device which comprises a main body for displaying video on a display screen, a first loudspeaker for reproducing sounds of low frequency, a second pair of loudspeakers for reproducing sounds of middle and high frequency, a duct for improving the low-frequency sound quality of the first loudspeaker and a stand for supporting the display body, wherein the stand has a portion being opposite to the duct outlet. A cabinet housing the first loudspeaker and the second pair of loudspeakers has a plurality of through holes made in a first area substantially corresponding to an aperture of each loudspeaker and has a plurality of not-through (blind) holes within the second area around the first area, wherein the periphery of the second area for the first loudspeaker and the periphery of the second areas for the second pair of loudspeakers are different from each other in form and/or size. The above-described structure of the loudspeaker system can obtain the stable quality of reproduced sounds featured by the well-balanced reproduction of sounds of low, middle and high frequencies by the effect that the sounds from the first loudspeaker are absorbed by the bottom body of the stand and reflected from the same, eliminating the possibility of decreasing the sound quality by the affection of material of floor on which the television receiver is mounted.

Another object of the present invention is to provide an image display device which comprises a main body for displaying video on a display screen, a first loudspeaker for reproducing sounds of low frequency and a second pair of loudspeakers for reproducing sounds of middle and high frequency range, wherein a box housing therein the first and second loudspeakers has a plurality of through holes made in a first area substantially corresponding to an aperture of each of the loudspeakers and has a plurality of not-through (blind) holes within the second area around the first area, wherein the periphery of the second area for the first loudspeaker and the periphery of the second area for the second pair of loudspeakers are different from each other in form and/or size. The above-described design can realize the loudspeaker system being apparently larger than the actual size and attaining a sophisticated appearance of the article. The first and second loudspeakers arranged one on the both sides of the first loudspeaker can present the visually symmetrical, fine external design of the loudspeaker box while maintaining the mechanical strength thereof.

Furthermore, the above-described image display device which may mount in its main body the first loudspeaker and the second pair of loudspeakers, wherein the first loudspeaker is arranged in the lower or upper portion of the main body and the second pair of loudspeakers are arranged one on the both sides of the first loudspeaker.

Furthermore, the above-described image display device may have a supporting stand on which the loudspeaker system is mounted in such a manner that the first loudspeaker is located between the second pair of loudspeakers. This can achieve a thinner design of a television receiver owing to separate mounting of the loudspeaker system on the stand.

Furthermore, the above-described image display device is featured by the fact that the first loudspeaker has a larger aperture than the second loudspeakers have.

Furthermore, the above-described image display device may have a loudspeaker system featured by the fact that a ratio of a whole area of through-holes relative to the first area for the first loudspeaker is greater than a ratio of a whole area of through-holes relative to the second loudspeakers.

PREFERRED EMBODIMENTS OF THE INVENTION

Preferred embodiments of the present invention will be described below with reference to accompanying drawings.

Figure 5:
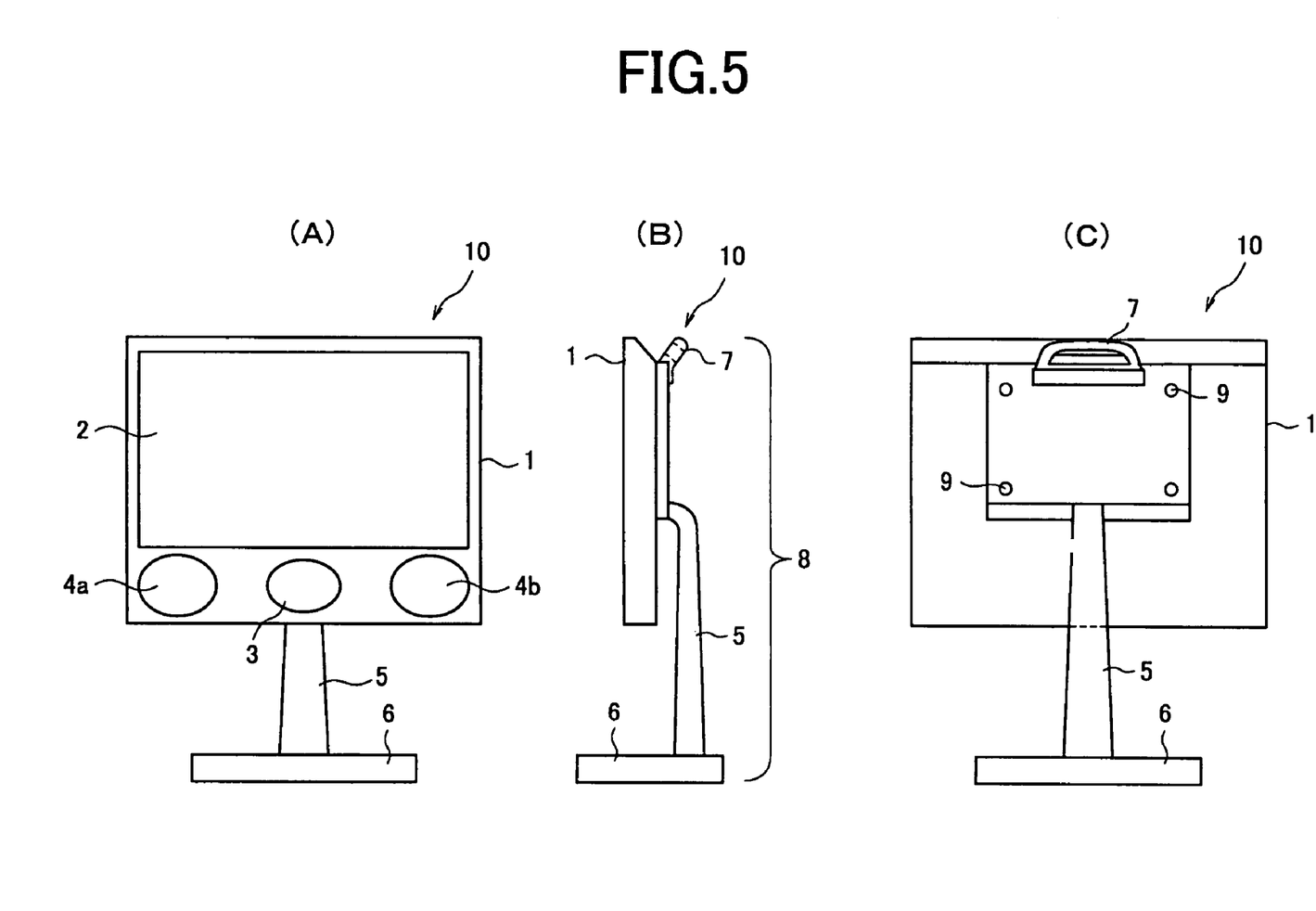
FIG. 5 illustrates a television receiver according to an embodiment of the present invention.

FIG. 5 shows a television receiver according to an embodiment of the present invention. FIG. 5(A) is a front view, FIG. 5(B) is a right-side view and FIG. 5(C) is a rear view of the television receiver. The television receiver 10 has a main display body 1 using a liquid crystal display (LCD) or a plasma display panel (PDP) and the like as a thin display unit 2, wherein the main body 1 is further provided at its front lower portion with a pair of left and right loudspeakers 4a, 4b for reproducing sounds of middle and high frequencies and a loudspeaker (woofer) 3 for reproducing sounds of low frequency placed between the pair of loudspeakers 4a and 4b.

A stand 8 is composed of a support 5, a base 6 and a handle unit 7. The stand 8 can be removably secured at its upper portion with machine screws 9 to the rear surface of the main display body 1. Thus, the main display body can be selectively used in any of two ways: a stand type display (as supported by the stand on a floor) or a wall type display (as being hung against the wall with the stand removed). This offers a great convenience for use to the user.

Figure 6:
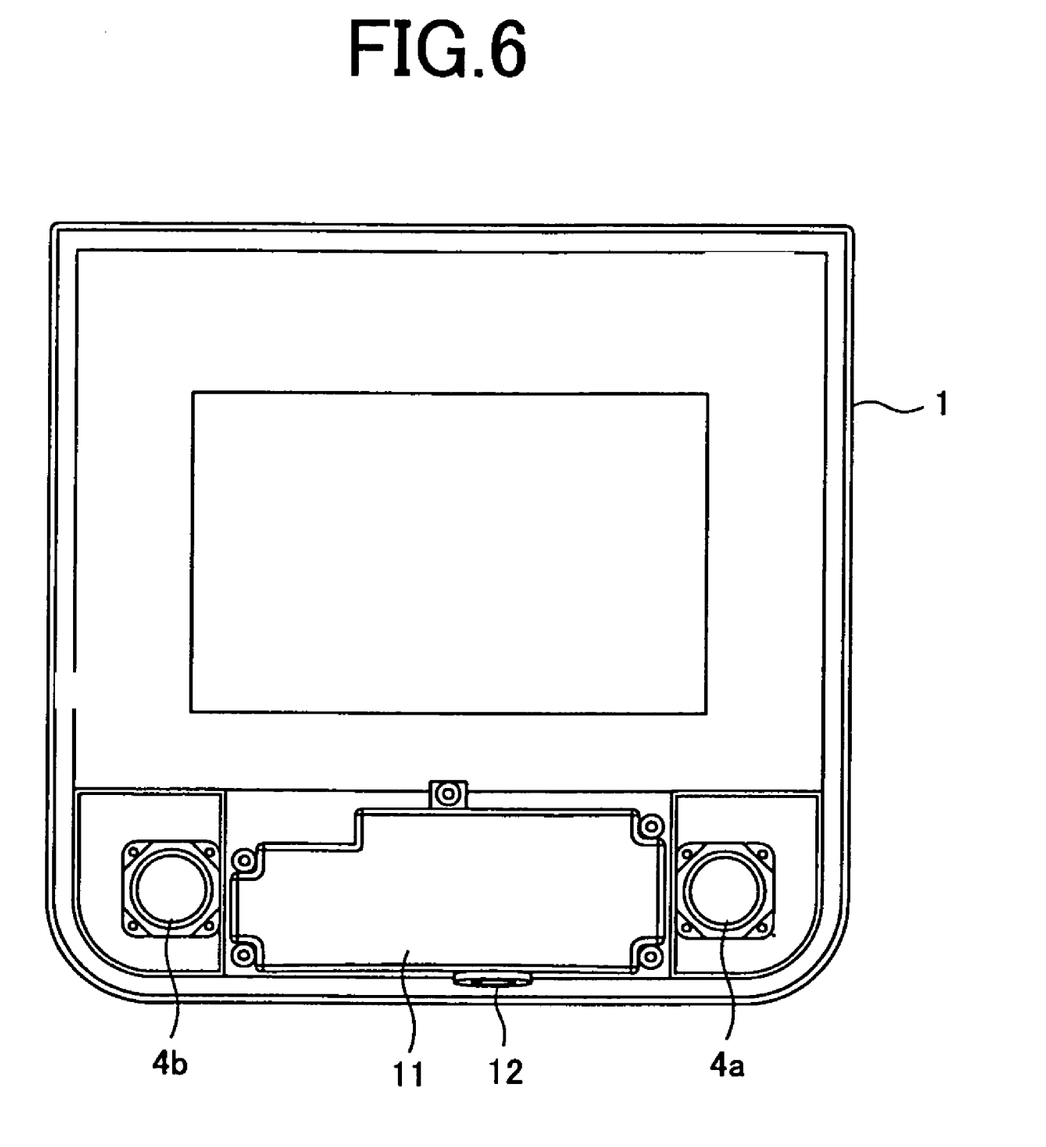
FIG. 6 is a schematic view of the inside of the main display unit of the television receiver of FIG. 5 when viewing from the rear face thereof.
Figure 7:
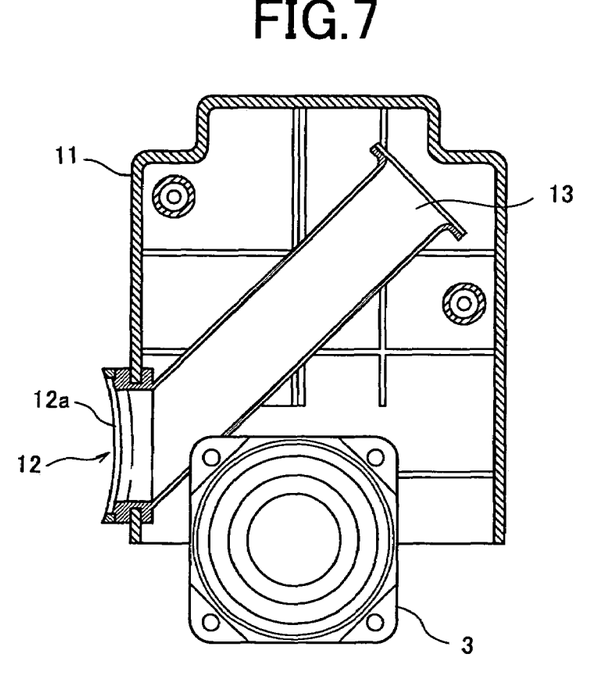
FIG. 7 illustrates an inside construction view of a loudspeaker box for reproducing sounds of relatively low frequency.
Figure 8:
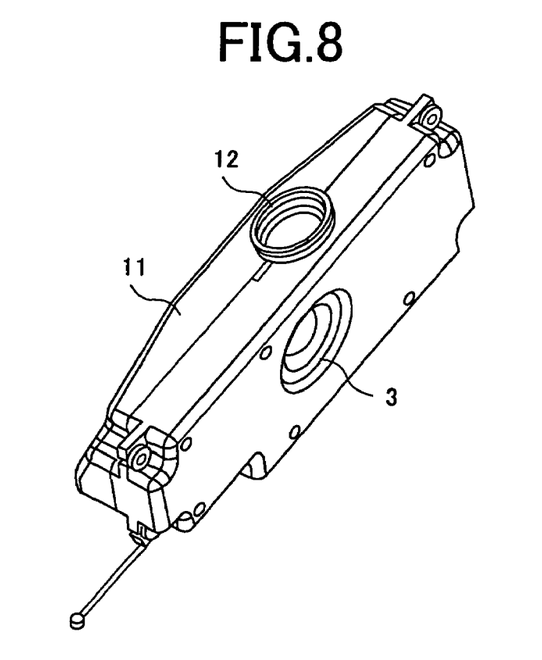
FIG. 8 is a perspective external view of a loudspeaker box for reproducing sounds of relatively low frequency.

Referring to FIGS. 6 to 8, a loudspeaker (woofer) 3 for reproducing sound of low frequency in the first embodiment of the present invention as shown in FIG. 5 will be described below in detail. FIG. 6 is a schematic view of the inside of the main display body 1 when it is viewed from the rear side. In FIG. 6, there are shown loudspeakers 4a, 4b for reproducing sounds of middle and high frequencies, a loudspeaker (woofer) box 11 for reproducing sound of low frequency and a sound duct outlet (sound outlet) 12.

FIGS. 7 and 8 are views for explaining the internal construction of the loudspeaker box 11 and the duct outlet 12 shown in FIG. 6. FIG. 7 shows an essential inside portion of the loudspeaker box 11 for reproducing sound of low frequency. FIG. 8 is a perspective external view of the loudspeaker box 11 for reproducing sound of low frequency.

The low-frequency sound reproducing loudspeaker (woofer) box 11 is featured by including a duct 13 having an elliptical profile. The low frequency property of sound to be reproduced by the loudspeaker box 11 may be improved by increasing the profile and length of the duct 13. However, to decrease the depth of the main display body 1 of the television receiver, it is also necessary to reduce the size and depth of the low-frequency sound reproducing loudspeaker box 11. For this purpose, the duct 13 of the woofer box 11 has an elliptical section and is installed so that the short axis of its section may be placed in the depth direction of the main display body 1. The use of the duct 13 having a square section must be avoided because it may cause the stagnation of sounds therein.

The duct 13 is arranged diagonally in the woofer box 11 so that it may be as long as possible to improve the low-frequency sound property. The duct 13 extends, bent downward and terminates in its outlet 12 in the bottom of the television receiver.

The tip face 12a of the duct 13 in the outlet portion 12 is axially tapered as show in FIG. 7 or the diameter of the outlet 12 may be larger than that of the duct 13. The above-mentioned design of the duct 13 can obtain the sufficient low-frequency sound property of sounds to be reproduced by the woofer box having the reduced size and profile.

When the television receiver 10 is supported by the stand 8 on a floor, the sounds reproduced by the loudspeaker system may be generally affected by material of the floor on which the receiver is placed. For example, the sound may be easily absorbed by a thick-carpeted floor or easily reflected by the metal-coated floor.

Figure 9:
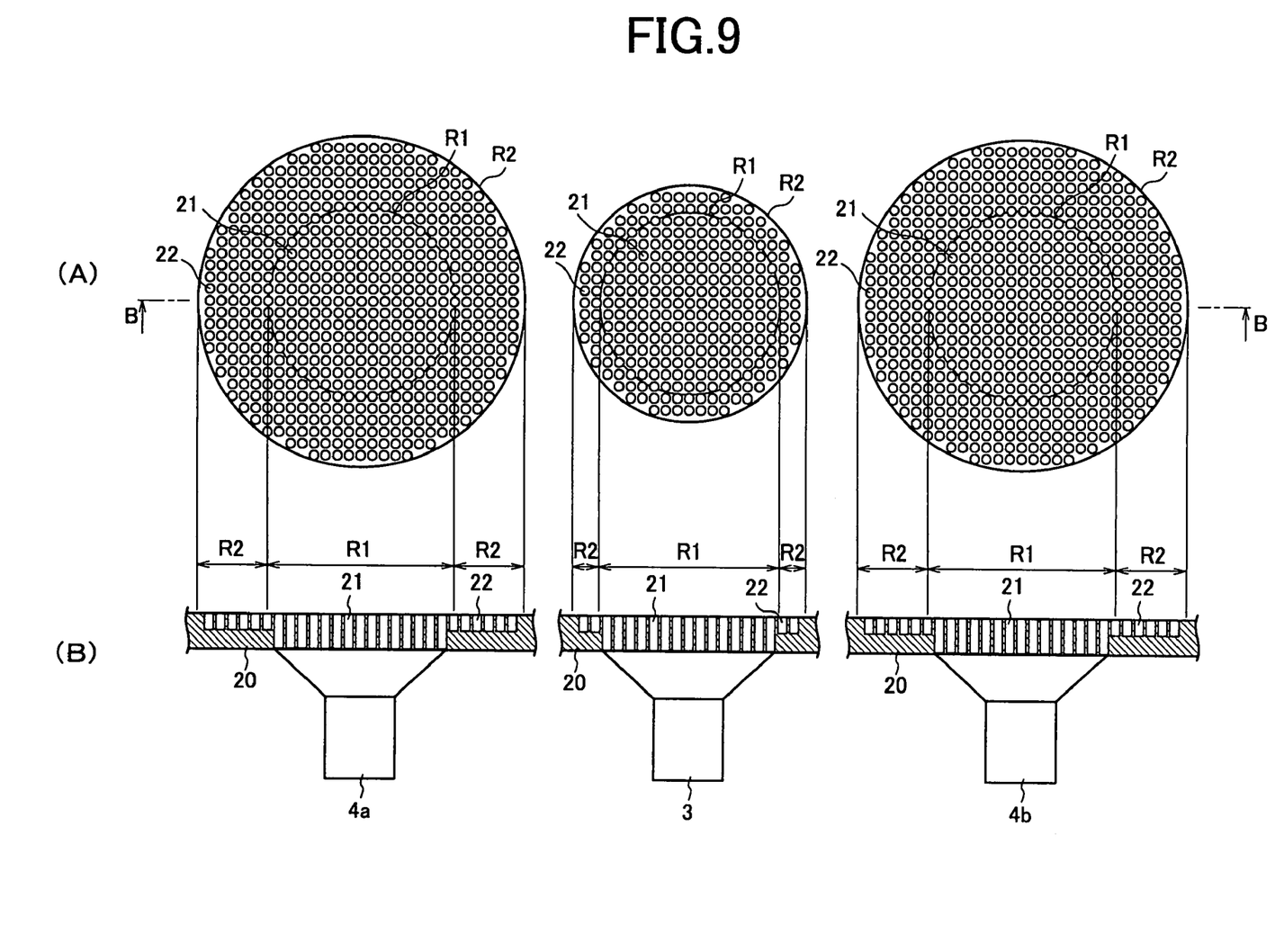
FIG. 9 is illustrative of an example of a loudspeaker system of a television receiver according to the present invention.
Figure 10:
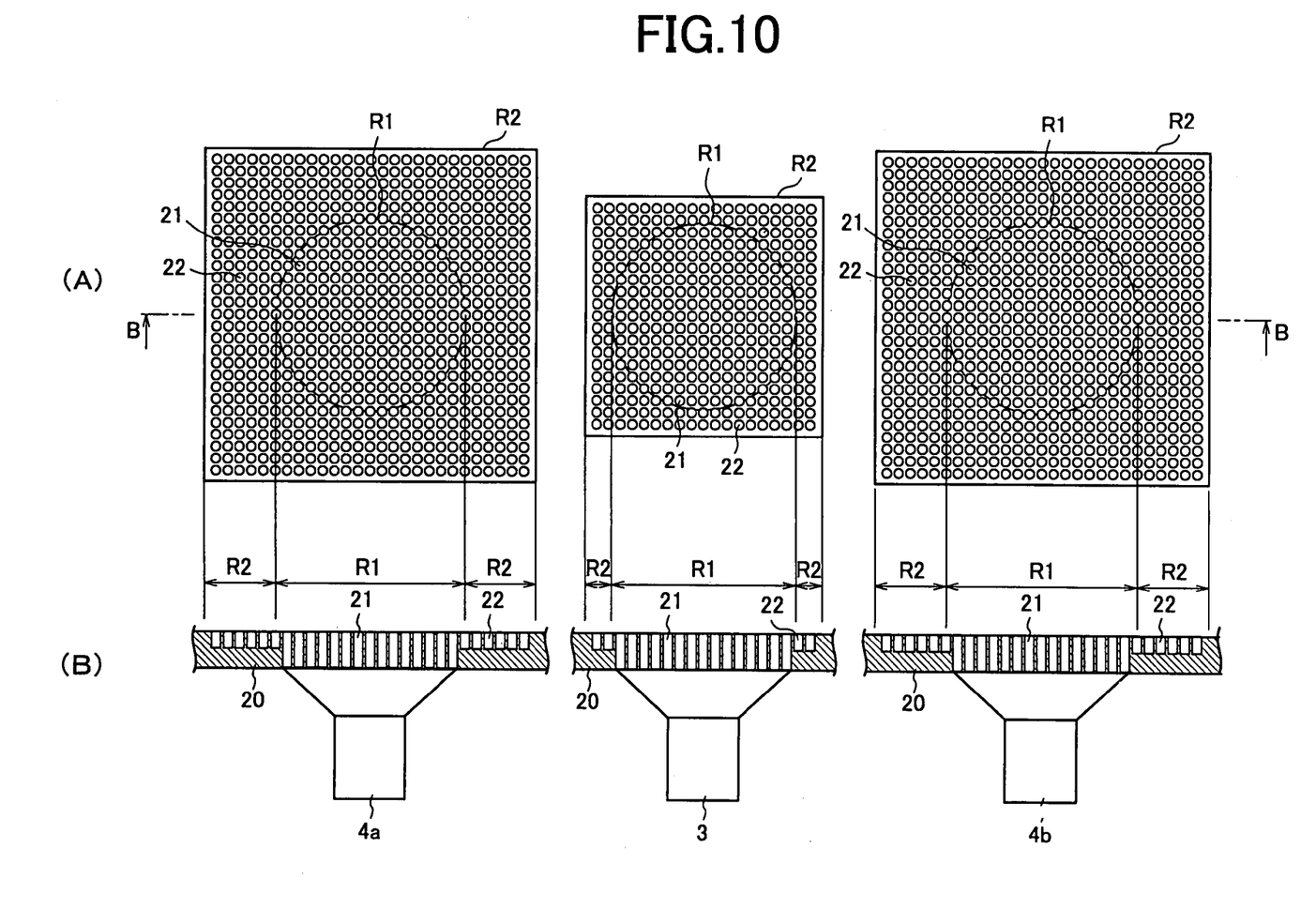
FIG. 10 is illustrative of another example of a loudspeaker system of a television receiver according to the present invention.
Figure 11:
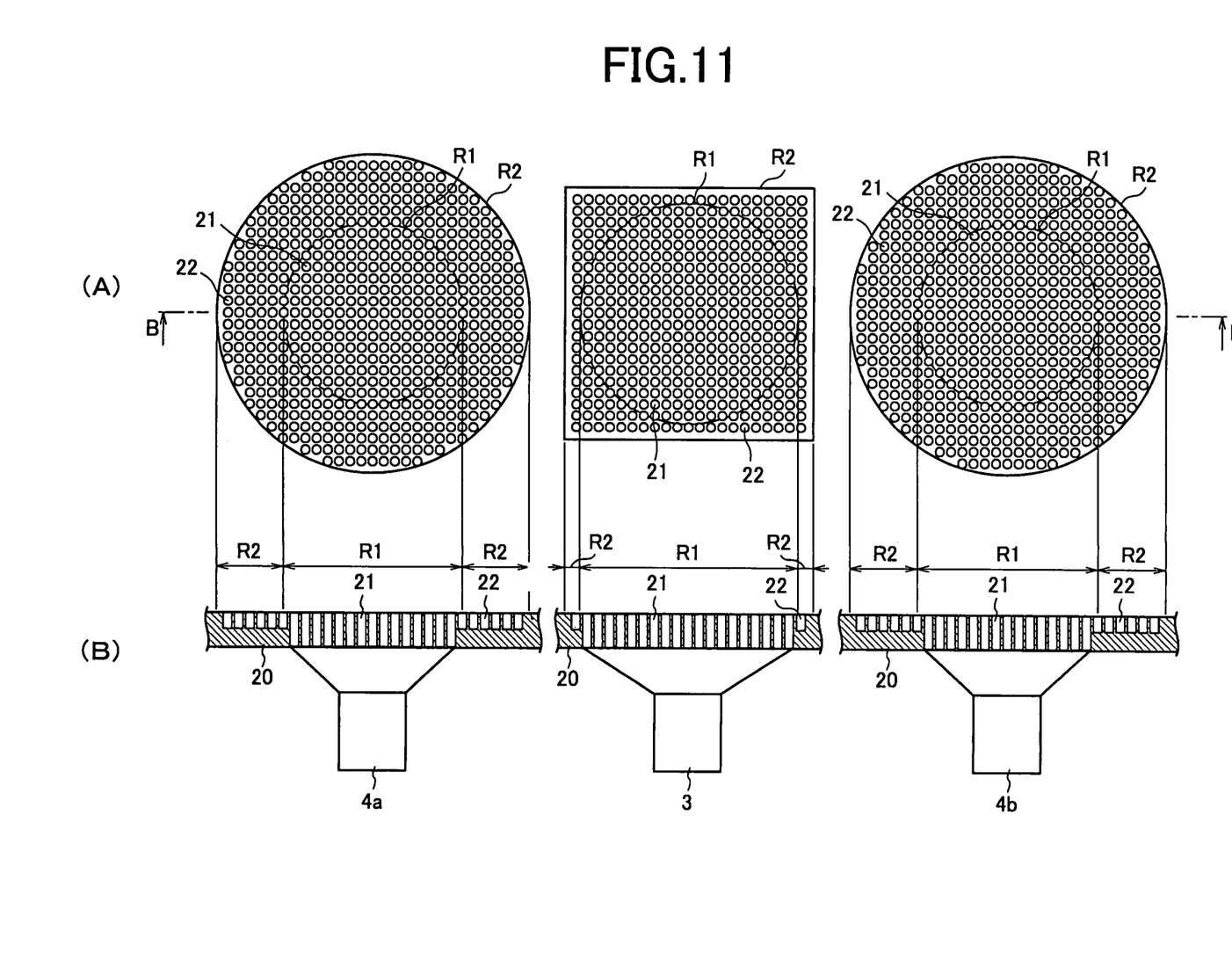
FIG. 11 is illustrative of another example of a loudspeaker system of a television receiver according to the present invention.

The television receiver 10 according to the present invention includes in the woofer box 11 the duct 13 having an outlet 12 being open in the bottom of the main display body and the stand 8 supporting the main display body has a base surface 6 being just opposite at its top surface to the duct outlet 12, thereby sound output from the duct outlet 12 can be constantly absorbed by and reflected from the base surface 6. Thus, the loudspeaker system can stably reproduce high quality sound without being affected by the flooring material. Referring to FIG. 9 to 11, an example of a loudspeaker system of a television receiver according to the present invention will be described below in detail. FIG. 9 illustrates an exemplary arrangement of three loudspeakers in the television receiver. FIG. 9(A) is a partially enlarged view of an exemplary housing (cabinet, etc.) incorporating three loudspeakers 3 (for reproducing low-frequency sound), 4a and 4b (for reproducing sounds of middle and high frequencies). FIG. 9(B) is a section taken along line B-B in FIG. 9(A).

Similarly, FIGS. 10 and 11 show another exemplary arrangement of three loudspeakers in the television receiver. FIG. 10A (11A) is a partially enlarged view of a housing incorporating three loudspeakers. FIG. 10B (11B) is a sectional view taken along line B-B in FIG. 10A (11A)

In a main display body 1 of a television receiver 10 provided with a thin display unit, a loudspeaker 3 for reproducing sounds of low frequencies and two loudspeakers 4a, 4b for reproducing sounds of middle and high frequencies are attached to the inside of a cabinet 20 composing a housing of the main display body 1. Sounds reproduced by these loudspeakers are output from the inside to the outside of the cabinet 20.

In each of the examples shown in FIGS. 9 to 11, each of the speakers 3, 4a and 4b is attached to the inside wall of the cabinet 20 which has a plurality of through holes 21 made in a wall area R1 corresponding to an aperture of each of the loudspeakers attached thereto. In other words, outer diameter of the wall area R1 is substantially equal to the aperture of each of the loudspeakers. The cabinet 20 has a plurality of not-through holes (blind holes) 22 made on an area R2 surrounding the area R1. The blind holes 22 are formed on the external surface of the cabinet 20, i.e., they are viewable to the user from the outside of the cabinet 20.

The through holes 21 and the blind holes 22 are each of about 0.5 to 2 mm in diameter and made in the quantity of several tens to several thousands per area for each loudspeaker. The area R2 having blind holes 22 formed therein for the loudspeaker 3 for reproducing sound of low frequency is different in size from the area R2 having blind holes 22 formed therein for each of the loudspeakers 4a, 4b for reproducing sounds of middle and high frequencies. In other words, the peripheral form and/or size of the area R2 for the loudspeaker 3 is different from that of the area R2 for each of the loudspeakers 4a and 4b.

Since the cabinet 20 is provided with area R2 with blind holes 22 formed therein around the area R1 having through holes 21 made therein as described above, each of the loudspeakers can be viewed apparently larger than its actual size, realizing a sophisticated appearance of the cabinet 20. The symmetrical arrangement of the loudspeakers 4a and 4b placed one on both sides of the loudspeaker 3 presents the well-balanced design of the loudspeaker cabinet 20 with an excellent external appearance while maintaining the sufficient mechanical strength of the cabinet 20.

For example, with the loudspeaker cabinet 20 designed in such that the aperture of the loudspeaker 3 for reproducing sound of low frequency is larger than the aperture of the loudspeaker 4a or 4b for reproducing sounds of middle and high frequencies while the area R2 with blind holes 22 formed therein for the low-frequency sound reproducing loudspeaker 3 is smaller than the area R2 with blind holes 22 formed therein for each of the middle and high frequency sound reproducing loudspeakers 4a and 4b, the user may visually recognize the loudspeaker 3 is small in comparison with the loudspeakers 4a and 4b and have a favorable impression of the sound effect owing to more sufficient low-frequency sound output from the loudspeaker 3 than the balance between the low-frequency sound and the middle and high frequency sounds visually obtained. In addition, the cabinet 20 has through holes only in the areas R1 corresponding to the respective loudspeakers' apertures and blind holes in other areas R2 not to allow dust into the inside of the cabinet and to prevent the occurrence of trembling sound. The absence of unnecessary openings in the cabinet 20 minimizes the leakage of sounds, maintaining the baffling effect of the cabinet 20.

A ratio of a total opening area of through holes 21 to a total area of a portion R1 (area R1) of the cabinet 20 is defined as an opening ratio. In the construction of the loudspeaker system shown in FIG. 9, the middle and high frequency sound reproducing loudspeakers 4a and 4b and the low-frequency sound reproducing loudspeaker 3 have the same aperture but the opening ratio of the through holes 21 for the loudspeaker 3 is different from that of the through holes 21 for each of the loudspeakers 4a and 4b. In the shown case, the opening ratio of through holes 21 for the loudspeaker 3 is larger than that for each of the loudspeakers 4a and 4b, thereby the low-frequency sound property is improved, attaining an improved balance between the low-frequency sound and middle and high frequency sounds.

In-the construction shown in FIG. 9, the blind-hole-formed areas R2 for the low-frequency sound loudspeaker 3 and the middle and high sound loudspeakers 4a and 4b have the same round shape at their peripheries.

In the construction of the loudspeaker system shown in FIG. 10, similarly with the example of FIG. 9, the middle and high frequency sound reproducing loudspeakers 4a and 4b and the low-frequency sound reproducing loudspeaker 3 have the same aperture sizes but the opening ratio of the through holes 21 for the loudspeaker 3 is different from that of the through holes 21 for each of the loudspeakers 4a and 4b. In the shown case, the opening ratio for the loudspeaker 3 is larger than that for each of the loudspeakers 4a and 4b, thereby the low-frequency sound property is improved, attaining an improved balance between the low-frequency sound and middle and high frequency sounds.

In different from the construction shown in FIG. 9, the loudspeaker system of FIG. 10 is featured by the design that the blind-hole-formed areas R2 for the low-frequency sound loudspeaker 3 and the middle and high sound loudspeakers 4a and 4b have the same square-shaped peripheries.

The constructions of the speaker systems as shown in FIGS. 9 and 10 can enhance the low-frequency sound and show the speakers to be larger than its actual size, realizing the sophisticated appearance of the system. The areas R1 each including a plurality of through holes 21 made therein have peripheries substantially similar in shape to those of corresponding loudspeakers 3, 4a and 4b while the areas R2 with blind holes 22 formed therein for respective loudspeakers may have any shape of their peripheries such as, for example, round, oval, quadrangular and polygonal. The maximum size of the areas R2 may be determined based on the mechanical strength of the cabinet 20 and the relation with the thin display unit 2 and the like. The sizes of the blind-hole-formed areas R2 may be determined irrespective of the sizes of the corresponding areas R1 having the through holes 21 formed therein. For example, the area R2 having the blind holes 22 formed therein for any loudspeaker may be of a small size even when the loudspeaker has a large diameter.

In the construction of the loudspeaker system shown in FIG. 11, the low-frequency sound loudspeaker 3 is larger in aperture size than the middle and high frequency sound loudspeakers 4a and 4b and the blind-hole-formed area R2 for the loudspeaker 3 is different in shape of its periphery from the blind-hole-formed areas R2 for the loudspeakers 4a and 4b. In the shown instance, the areas R2 with blind holes 22 formed therein for the middle and high frequency sound reproducing loudspeakers 4a and 4b have a round shape at their peripheries while the area R2 with blind holes 22 formed therein for the low-frequency sound reproducing loudspeaker 3 has a quadrangular shape at its periphery.

The above-described embodiment can enhance the low-frequency sound and show the speaker to be larger than its actual size, obtaining the sophisticated appearance of the system. The areas R1 each including a plurality of through holes 21 made therein have peripheries substantially similar in shape to those of corresponding loudspeakers 3, 4a and 4b while the areas R2 with blind holes 22 formed therein for respective loudspeakers may have any shape of their peripheries such as, for example, round, oval, quadrangular and polygonal. The maximum size of the blind-hole-formed areas R2 may be determined based on the mechanical strength of the cabinet 20 and/or the relation with the thin display unit 2 and the like. The sizes of the blind-hole-formed areas R2 may be determined irrespective of the sizes of the corresponding areas R1 having the through holes 21 formed therein. For example, the area R2 having the blind holes 22 formed therein for any loudspeaker may be of a small size even when the loudspeaker has a large aperture.

Figure 12:
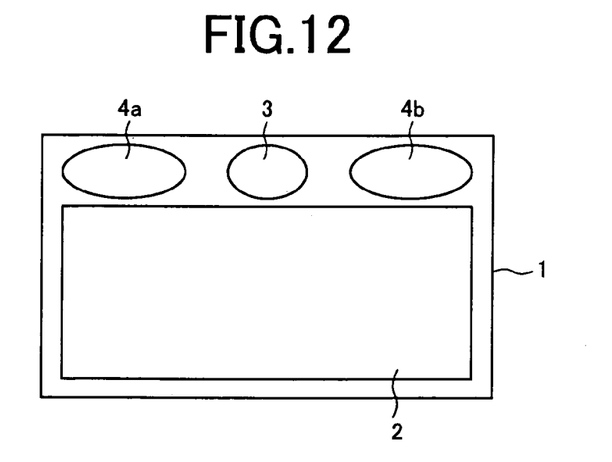
FIG. 12 illustrates an exemplary arrangement of two loudspeakers for reproducing sound of low frequency and for reproducing sounds of middle and high frequencies in relation to main display device according to the present invention.
Figure 13:
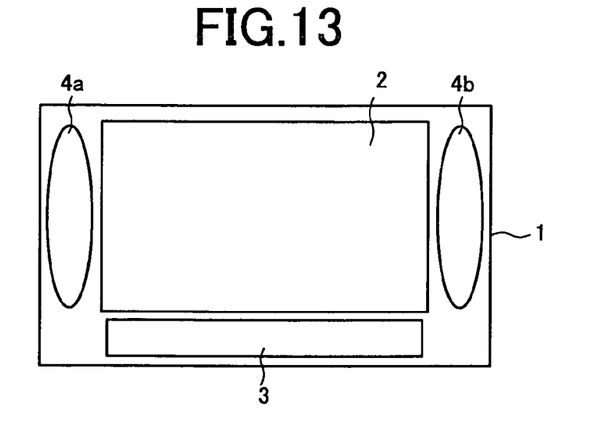
FIG. 13 illustrates another exemplary arrangement of a loudspeaker for reproducing sound of low frequency and a pair of loudspeakers for reproducing sounds of middle and high frequencies in relation to main display device according to the present invention.
Figure 14:
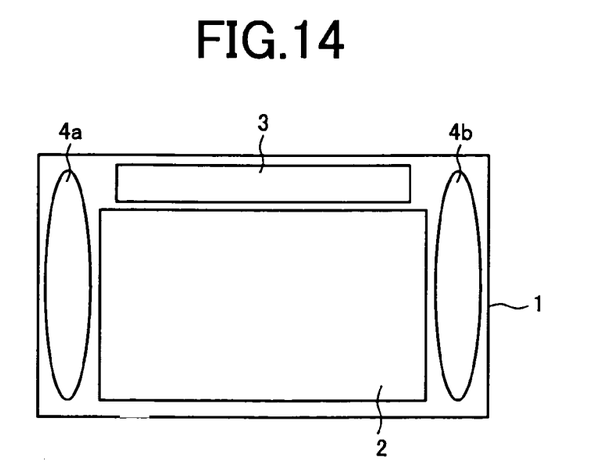
FIG. 14 illustrates another exemplary arrangement of a loudspeaker for reproducing sound of low frequency sounds and a pair of loudspeakers for reproducing middle and high frequencies in relation to main display device according to the present invention.

FIGS. 12 to 14 show other respective embodiments which are featured by different arrangements of the loudspeaker 3 for reproducing low-frequency sound and the pair of loudspeakers 4a and 4b for reproducing the middle high sounds. In the embodiment shown in FIG. 12, a pair of loudspeakers 4a and 4b for reproducing sounds of middle and high frequencies are arranged one on the left and right sides on the front upper part of a thin display unit 2 of a main display body 1 and a loudspeaker (woofer) 3 for reproducing sounds of low frequency is arranged at the center between the loudspeakers 4a and 4b on the front upper part of the thin display unit.

In the embodiment shown in FIG. 13, a pair of loudspeakers 4a and 4b for reproducing sounds of middle and high frequencies are arranged one on the front left and right sides of a thin display unit 2 of a main display body 1 and a loudspeaker (woofer) 3 for reproducing sounds of low frequency is arranged on the front lower part of the thin display unit 2.

In the embodiment shown in FIG. 14, a pair of loudspeakers 4a and 4b for reproducing sounds of middle and high frequencies are arranged one on the front left and right sides of a thin display unit 2 of a main display body 1 and a loudspeaker (woofer) 3 for reproducing sounds of low frequencies is arranged on the front upper part of the thin display unit 2.

In each of the embodiments of FIGS. 12 to 14, the above described through holes 21 and blind holes 22 are formed in the way described in FIGS. 9 to 11 to attain the same effect as described above.

Figure 15:
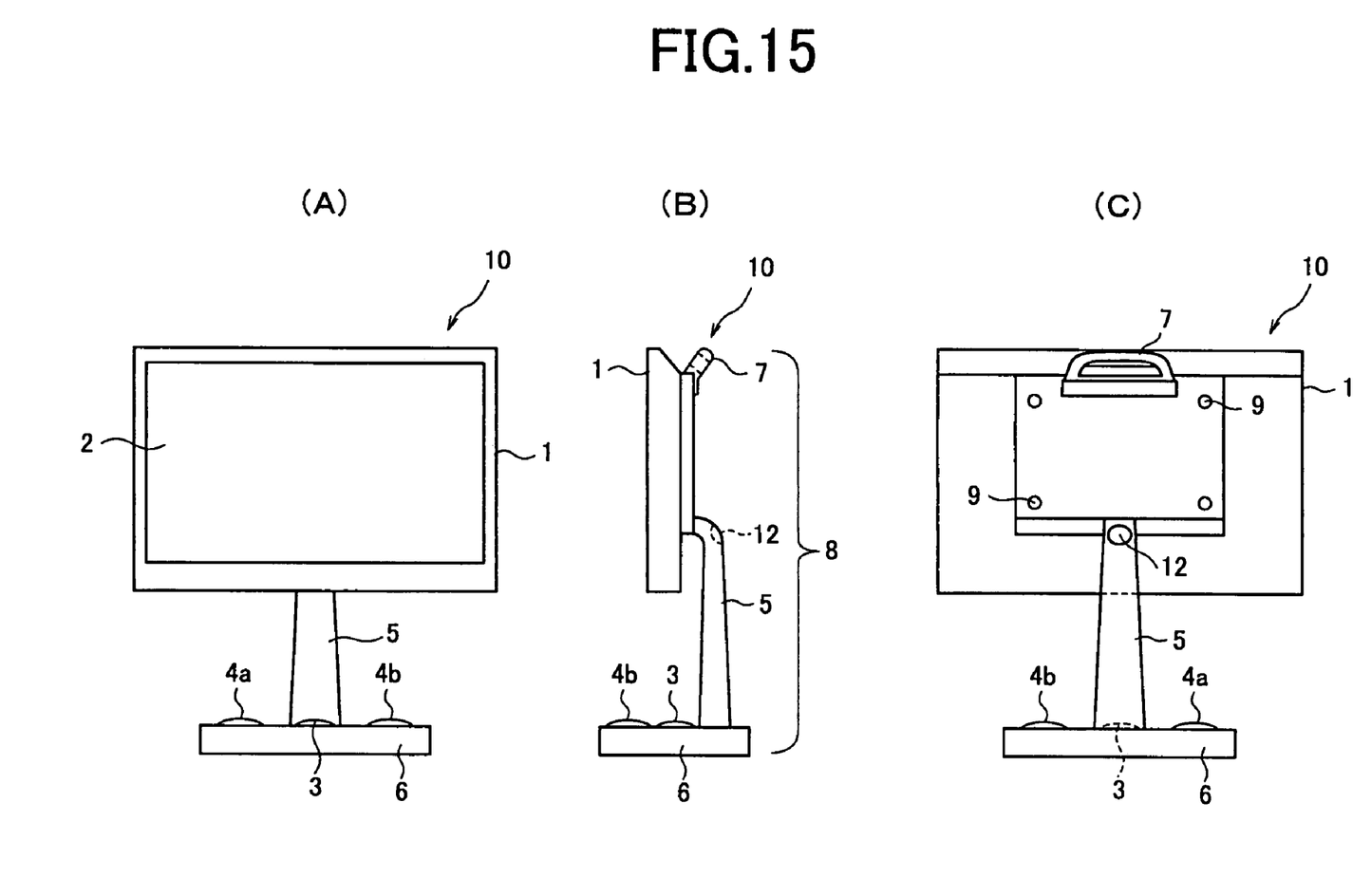
FIG. 15 illustrates a television receiver according to a further embodiment of the present invention.

FIG. 15 shows a television receiver according to a further embodiment of the present invention. FIG. 15(A) is a front view, FIG. 15(B) is a right side view and FIG. 15(C) is a rear view of the television receiver. The television receiver 10 has a main display body 1 using a liquid crystal display (LCD) or a plasma display panel (PDP) and the like as a thin display unit 2 and can be supported by a stand 8 composed of a support 5, a base 6 and a handle 7. The stand 8 can be removably attached at its upper portion with machine screws 9 to the rear surface of the main display body 1. Thus, the main display body can be selectively used in any of two ways: a standing type display (as supported by the stand on a floor) or a wall type display (as being hung against the wall with the stand removed). This offers a great convenience for use of it by the user.

The stand 8 is provided at its base 6 with a low frequency sound reproducing loudspeaker (woofer) 3 arranged at a center thereof and two middle and high frequency sound reproducing loudspeakers 4a and 4b arranged left and right sides thereof.

In this instance, a thin and compact television receiver is realized since the loudspeaker system is separately mounted on the stand base.

In this embodiment, a low-frequency sound reproducing speaker (woofer) box 11 as shown in FIGS. 6 to 8 is mounted in such a way that an outlet 12 of a duct 13 is placed in outward direction. In the present embodiment, the outlet 12 of the duct 13 is placed behind the stand support 5.

Although the loudspeakers 3, 4a and 4b are mounted on the base 6 of the stand 8, any one or all of them may be mounted on the support 5 of the stand 8.

In the embodiment, through holes 21 and blind holes 22 are formed in the way described in FIG. 15 to attain the same effect as described before with reference to FIGS. 9 to 11.

As is apparent from the foregoing, the television receiver 10 according to an aspect of the present invention includes in the woofer box 11 the duct 13 having an outlet 12 open in the bottom of the main display body and the stand 8 supporting the main display body has a base 6 being just opposite at its top surface to the duct outlet 12, thereby sound output from the duct outlet 12 can be constantly absorbed by and reflected from the base surface 6. Thus, the loudspeaker system can stably reproduce well-balanced high-quality sounds with no affection of the floor material, preventing the occurrence of a tremble.

The cabinet 20 of the main display body 1 or the housing having each loudspeaker of 3, 4a, and 4b of such as the base 6 therein is provided with a plurality of through holes 21 formed in areas R1 substantially corresponding to apertures of respective loudspeakers and a plurality of blind holes 22 formed in areas R2 surrounding the respective areas R1. This makes the loudspeakers look larger than actual, attaining a sophisticated appearance. The symmetrical arrangement of the middle and high frequency sound reproducing loudspeakers 4a and 4b on the both sides of the low-frequency sound reproducing loudspeaker 3 in the cabinet 20 or the stand base 6 presents a well-balanced, good-designed appearance of the loudspeaker system while maintaining the necessary mechanical strength of the cabinet 20 and the like.

Furthermore, the cabinet 20 has through holes only within the areas R2 corresponding to aperture sizes of corresponding loudspeakers and blind holes in other areas R1 not to allow dust into the inside of the cabinet 20 and to prevent the occurrence of a tremble. The absence of unnecessary openings in the cabinet 20 minimizes the leakage of sounds, maintaining the baffling effect of the cabinet 20.

The television receiver according to the present invention is designed to be selectively used in any of two ways: a television receiver secured to a stand to be placed on a table or a floor or a wall television receiver to be hung against a wall without using a stand 8 which can be removed from the main display body. Thus, a convenient flat television receiver can be provided.

A further flat and compact television receiver can be provided by mounting three loudspeakers 3, 4a and 4b on the stand 8 (on the base 6 or the support 5 of the stand).

The loudspeaker housing (cabinet 20) of the television receiver has a plurality of through holes in each of areas R1 having sizes corresponding to aperture sizes of respective loudspeakers 3, 4a and 4b and the opening ratio of the through holes 21 for the loudspeaker 3 is larger than that of the through holes 21 for each of the loudspeakers 4a and 4b, thereby the low-frequency sound property is improved attaining an improved balance between the low frequency sound and middle and high frequency sounds.

INDUSTRIAL APPLICABILITY

The image display device according to the present invention can be applied to a personal computer or a television receiver provided with a thin display unit such as a liquid crystal display (LCD), plasma display panel (PDP) and the like. It has a high quality loudspeaker system which is featured by an improved sound field expanding effect by using a low frequency sound reproducing loudspeaker (woofer) and a pair of middle and high frequency sound reproducing loudspeakers (tweeters).

The invention claimed is:

1. An image display device comprising:
   a main display body provided with
      a display portion for presenting an image,
      a first loudspeaker for reproducing sounds of low frequency,
      a second pair of loudspeakers for reproducing sounds of middle and high frequencies, and
      a duct for improving a low frequency sound property of the first loudspeaker; and
   a stand for supporting the main display body, wherein the stand has a portion being opposite to an outlet of the duct.

2. The image display device as defined in claim 1, further comprising a housing having the first loudspeaker and the second pair of loudspeakers therein, the housing having a plurality of through hole in a first area corresponding to an aperture size of each loudspeaker and a plurality of blind holes in a second area surrounding the first area, wherein
   the second area for the first loudspeaker is different in peripheral shape and/or size from the second area for each of the second pair of loudspeakers.

3. The image display device as defined in claim 2, wherein a ratio of a total opening area of the through holes to the first area for the first loudspeaker is larger than the ratio for the second pair of loudspeakers.

4. The image display device as defined in claim 2, wherein an aperture size of the first loudspeaker is larger than that of the second loudspeakers.

5. The image display device as defined in claim 1, wherein an aperture size of the first loudspeaker is larger than that of each of the second loudspeakers.

6. The image display device as defined in claim 5, further comprising a housing the first loudspeaker and the second pair of loudspeakers therein, the housing having a plurality of through holes in a first area corresponding to the aperture size of each loudspeaker and a plurality of blind holes in a second area surrounding the first area, wherein
   a ratio of a total opening area of the through holes to the first area for the first loudspeaker is lager than the ratio for the second pair of loudspeakers.

7. An image display device comprising:
   a main display body provided with
      a display portion for presenting an image, and
      a housing having
         a first loudspeaker for reproducing sounds of low frequency,
         a second pair of loudspeakers for reproducing sounds of middle and high frequencies, and
         a duct for improving a low frequency sound property; and a stand for supporting the main display body, wherein
the housing has a plurality of through holes formed in a first area corresponding to an aperture of each of the loudspeakers and a plurality of blind holes formed in a second area surrounding the first area, and the second area for the first loudspeaker is different in peripheral shape and/or size from the second area for each of the second pair of loudspeakers.

8. The image display device as defined in claim 7, wherein the first and second loudspeakers are provided in the main display body, with the first loudspeaker is mounted in a lower portion or an upper portion of the main display body and each of the second loudspeakers arranged respectively on left and right sides of first loudspeaker.

9. The image display device as defined in 8, wherein an aperture of the first loudspeaker is larger than that of each of the second pair of loudspeakers.

10. The image display device as defined in 8, wherein a ratio of a total opening area of the through holes to the first area for the first loudspeaker is larger than the ratio for second pair of loudspeakers.

11. The image display device as defined in claim 7, wherein
the first loudspeaker and the second pair of loudspeakers are mounted on the stand with the first loudspeaker is placed at a center and each of the second loudspeakers are arranged respectively on left and right sides of the first loudspeaker.

12. The image display device as defined in 11, wherein an aperture of the first loudspeaker is larger than that of each of the second pair of loudspeakers.

13. The image display device as defined in 11, wherein a ratio of a total opening area of the through holes to the first area for the first loudspeaker is larger than the ratio for the second pair of loudspeakers.

14. The image display device as defined in claim 7, wherein
an aperture of the first loudspeaker is larger than that of each of the second pair of loudspeakers.

15. The image display device as defined in 14, wherein a ratio of a total opening area of the through holes to the first area for the first loudspeaker is larger than the ratio for the second pair of loudspeakers.

16. The image display device as defined in claim 7, wherein
a ratio of a total opening area of the through holes to the first area for the first loudspeaker is larger than the ratio for the second pair of loudspeakers.

* * * * *